United States Patent [19]
Hoekman et al.

[11] Patent Number: 5,734,338
[45] Date of Patent: Mar. 31, 1998

[54] VEHICLE DETECTOR WITH AUTOMATIC SENSITIVITY ADJUSTMENT

[75] Inventors: Earl B. Hoekman, Roseville, Minn.; Martin C. Henderson, Reseda, Calif.

[73] Assignee: Minnesota Mining and Manufacturing Company, St. Paul, Minn.

[21] Appl. No.: 351,889

[22] Filed: Dec. 8, 1994

Related U.S. Application Data

[63] Continuation of Ser. No. 989,919, Dec. 11, 1992, abandoned, which is a continuation of Ser. No. 729,448, Jul. 12, 1991, abandoned.

[51] Int. Cl.$^6$ ........................................... G08G 1/01
[52] U.S. Cl. ..................... 340/941; 324/655; 340/939
[58] Field of Search ........................... 340/933, 936, 340/939, 941; 377/9; 324/655

[56] References Cited

U.S. PATENT DOCUMENTS

| | | | |
|---|---|---|---|
| 3,868,626 | 2/1975 | Masher | 340/939 |
| 3,873,964 | 3/1975 | Potter | 340/941 |
| 3,943,339 | 3/1976 | Koerner et al. | 235/92 |
| 3,989,932 | 11/1976 | Koerner | 235/92 |
| 4,131,848 | 12/1978 | Battle | 340/941 |
| 4,368,428 | 1/1983 | Dijkman | 324/178 |
| 4,449,115 | 5/1984 | Koerner | 340/941 |
| 4,459,561 | 7/1984 | Clark et al. | 331/65 |
| 4,472,706 | 9/1984 | Hodge et al. | 340/941 |
| 4,491,841 | 1/1985 | Clark | 340/939 |
| 4,668,951 | 5/1987 | Duley et al. | 340/941 |
| 4,829,546 | 5/1989 | Dueckman | 377/6 |
| 4,862,162 | 8/1989 | Duley | 340/938 |
| 4,873,494 | 10/1989 | Jefferis | 331/65 |
| 4,949,054 | 8/1990 | Briefer | 331/117 |
| 5,153,525 | 10/1992 | Hoekman et al. | 340/941 |
| 5,281,965 | 1/1994 | Hoekman et al. | 340/941 |

FOREIGN PATENT DOCUMENTS

| | | | |
|---|---|---|---|
| 0 004 892 | 10/1979 | European Pat. Off. | G08G 1/015 |
| 1398937 | 6/1975 | United Kingdom | 340/941 |

*Primary Examiner*—Brent A. Swartout
*Attorney, Agent, or Firm*—Gary L. Griswold; Kari H. Bartingale; Peter L. Olson

[57] ABSTRACT

The period $T_{nv}$ of an oscillator signal is measured. A number $N_{meas}$ of cycles of the oscillator signal is determined based upon the measured oscillator period $T_{nv}$ and upon a desired minimum change in inductance $\Delta L$ (sensitivity) which will result in an object being detected. The $N_{meas}$ cycles of the oscillator signal represent a measurement period. The length of the measurement period, defined by $N_{meas}$ oscillator cycles, is periodically determined. The length of the measurement period is compared to a reference value. An output, based upon the results of the comparison, is provided. Thereafter, the desired minimum change in inductance $\Delta L$ (sensitivity) may be automatically adjusted by determining an average magnitude change in inductance $\Delta L_{ave}$ caused by a plurality of vehicles. The number $N_{meas}$ of oscillator cycles, which define the measurement period, is recalculated based upon the average magnitude change in inductance.

17 Claims, 2 Drawing Sheets

VEHICLE DETECTOR WITH AUTOMATIC SENSITIVITY ADJUSTMENT

This application is a continuation of U.S. application Ser. No. 07/989,919, filed Dec. 11, 1992, now abandoned, which is a continuation of U.S. application Ser. No. 07/729,448, filed Jul. 12, 1991, abandoned.

BACKGROUND OF THE INVENTION

The present invention relates to vehicle detectors which detect the passage or presence of a vehicle over a defined area of a roadway. In particular, the present invention relates to a method of automatically adjusting vehicle detector sensitivity.

Inductive sensors are used for a wide variety of detection systems. For example, inductive sensors are used in systems which detect the presence of conductive or ferromagnetic articles within a specified area. Vehicle detectors are a common type of detection system in which inductive sensors are used.

Vehicle detectors are used in traffic control systems to provide input data required by a controller to control signal lights. Vehicle detectors are connected to one or more inductive sensors and operate on the principle of an inductance change caused by the movement of a vehicle in the vicinity of the inductive sensor. The inductive sensor can take a number of different forms, but commonly is a wire loop which is buried in the roadway and which acts as an inductor.

The vehicle detector generally includes circuitry which operates in conjunction with the inductive sensor to measure changes in inductance and to provide output signals as a function of those inductance changes. The vehicle detector includes an oscillator circuit which produces an oscillator output signal having a frequency which is dependent on sensor inductance. The sensor inductance is in turn dependent on whether the inductive sensor is loaded by the presence of a vehicle. The sensor is driven as a part of a resonant circuit of the oscillator. The vehicle detector measures changes in inductance in the sensor by monitoring the frequency of the oscillator output signal.

Examples of vehicle detectors are shown, for example, in U.S. Pat. No. 3,943,339 (Koerner et al.) and in U.S. Pat. No 3,989,932 (Koerner).

Detection of a vehicle is accomplished by comparing a measurement value, based upon the oscillator frequency, to a reference value. If the difference between the measurement value and the reference value exceeds a threshold value, a vehicle is detected. Sensitivity represents the threshold change in sensor drive oscillator signal period that will cause the vehicle detector to determine that a vehicle is present over the sensor.

Several methods of adjusting detector sensitivity are known. One method, not frequently used, is to adjust the actual threshold value. Much more common are methods of using various known relationships to adjust the measurement period, during which the measurement value is determined, to adjust the measurement value in order to change the detector sensitivity.

A method of adjusting sensitivity originally implemented in analog detectors involved selecting a fixed measurement time period for a particular sensitivity setting. This method results in the ratio $\Delta L/L$ (the change in inductance caused by the vehicle to be detected divided by the total inductance) being measured as the means for detecting a vehicle. The advantage of this method is that it has a fixed measurement time for any given sensitivity setting, regardless of the actual detector and sensor inductances. The disadvantage of this method is that for a particular sensitivity setting, the minimum size of vehicle that will be detected increases at the same rate as the sensor inductance $L_{sensor}$ is increasing.

Another method of sensitivity adjustment, described by Koerner in U.S. Pat. No. 3,989,932, involves adjusting the measurement period to equal a predetermined number of sensor drive oscillator signal cycles. Each sensitivity setting would then correspond to a time period occurring during a different fixed number of oscillator cycles. Detectors using this technique count the number of cycles of a high frequency clock that occur during a predetermined number of sensor drive oscillator cycles. When the most recent count decreases from a reference count by a threshold amount, a vehicle is detected. Utilizing this technique results in detection decisions being made based on the measured ratio:

$$\frac{\Delta L}{\sqrt{L}}$$

The advantage of this second method of setting sensitivity is that for a particular sensitivity setting, as loop inductance increases, the minimum size of vehicle that may be detected increases at a lower rate than the inductance. The disadvantage of this method is that as sensor inductance increases, the measurement time also increases. This may cause difficulties in applications in which measurement time is critical, such as vehicle speed measurement.

Both of the previously mentioned methods of adjusting the measurement period are dependent on the total inductance $L_{Total}$ of the detector, lead wire and sensor. These methods, based upon a percent change in inductance, require different sensitivity settings when the sensor is connected to the detector by a long lead wire than when the lead wire is shorter. A method, as the present invention describes, capable of basing sensitivity only on a change of inductance $\Delta L$, would be useful in providing consistent sensitivity regardless of the total inductance and therefore regardless of lead wire length.

Prior art detector systems also require an operator interface to set or change the sensitivity of the detector. For a detector to be set at a particular desired sensitivity level, the operator is required to observe the change in inductance caused by the smallest vehicle for which detection is desired by adjusting the sensitivity until that vehicle is detected. A system capable of automatically setting its parameters to values corresponding to known sensitivities sufficient to detect particular vehicle types would provide many benefits.

SUMMARY OF THE INVENTION

The present invention includes a method of setting sensitivity in an object detector having an inductive sensor whose inductance varies with the presence of a vehicle in a detection area. The method is particularly applicable to vehicle detectors, and is based directly upon a change in inductance $\Delta L$ caused by particular vehicle types. Also included in a preferred embodiment of the present invention is a method of automatically adjusting detector sensitivity. The invention results in enhanced detector sensitivity and accuracy, while not requiring the presence of a skilled operator to make adjustments.

The $\Delta L$ sensitivity method begins by measuring the period $T_{nv}$ of the sensor drive oscillator. A number $N_{meas}$ of cycles of the oscillator signal is determined based upon the measured oscillator period $T_{nv}$ and upon a desired $\Delta L$ sensitivity setting which represents the minimum change in inductance which will result in an object being detected. Each $N_{meas}$ oscillator cycles constitute one measurement period. The length of the measurement period is periodically determined and compared to a reference value. If the difference between the length of the measurement period and the reference value is greater than a threshold value, an output indicative of the presence of a vehicle is provided.

Thereafter, the $\Delta L$ sensitivity may be automatically adjusted by determining an average magnitude change in inductance $\Delta L_{ave}$ caused by a plurality of vehicles. The number of oscillator cycles $N_{meas}$ constituting a measurement period is recalculated based upon the average magnitude change in inductance $\Delta L_{ave}$.

DETAILED DESCRIPTION OF THE PREFERRED EMBODIMENTS

(1) Overall System Description

Figure 1:
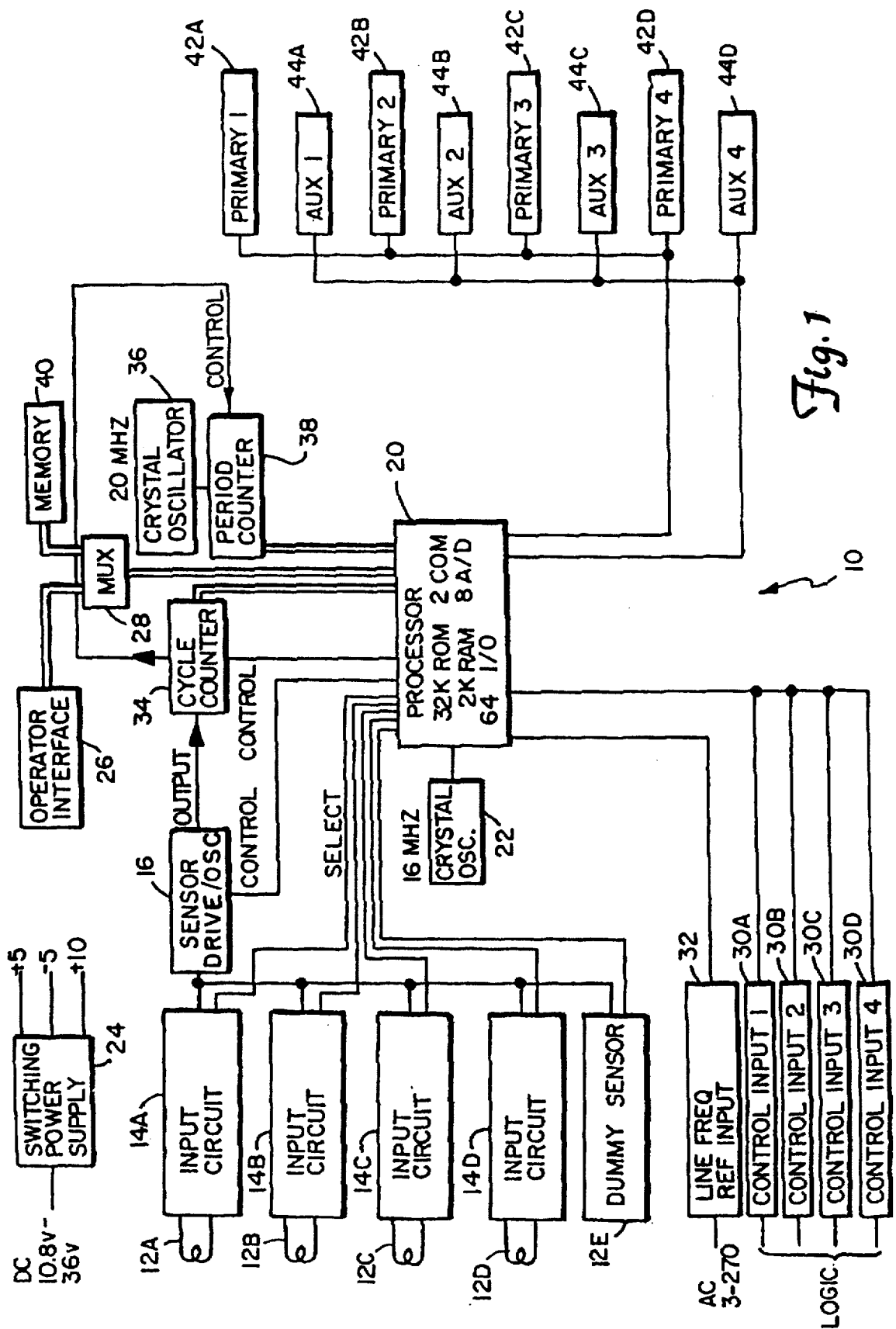
FIG. 1 is a block diagram of a vehicle detector which is capable of making use of the sensitivity adjustment method of the present invention.

Vehicle detector 10 shown in FIG. 1 is a four channel system which monitors the inductance of inductive sensors 12A, 12B, 12C and 12D. Each inductive sensor 12A-12D is connected to an input circuit 14A-14D, respectively. Sensor drive oscillator 16 is selectively connected through input circuits 14A-14D to one of the inductive sensors 12A-12D to provide a drive current to one of the inductive sensors 12A-12D. The particular inductive sensor 12A-12D which is connected to oscillator 16 is based upon which input circuit 14A-14D receives a sensor select signal from digital processor 20. Sensor drive oscillator 16 produces an oscillator signal having a frequency which is a function of the inductance of the inductive sensors 12A-12D to which it is connected.

Also shown in FIG. 1, dummy sensor 12E is provided and is connected to sensor drive oscillator 16 in response to a select signal from digital processor 20. Dummy sensor 12E has an inductance which is unaffected by vehicles, and therefore provides a basis for adjustment or correction of the values measured by inductive sensors 12A-12D.

The overall operation of vehicle detector 10 is controlled by digital processor 20. Crystal oscillator 22 provides a high frequency clock signal for operation of digital processor 20. Power supply 24 provides the necessary voltage levels for operation of the digital and analog circuitry within the vehicle detector 10.

Digital processor 20 receives inputs from operator interface 26 (through multiplexer 28), and receives control inputs from control input circuits 30A-30D. In a preferred embodiment, control input circuits 30A-30D receive logic signals, and convert those logic signals into input signals for processor 20.

Processor 20 also receives a line frequency reference input signal from line frequency reference input circuit 32. This input signal aids processor 20 in compensating signals from inductive sensors 12A-12D for inductance fluctuations caused by nearby power lines.

Cycle counter 34, crystal oscillator 36, period counter 38, and processor 20 form detector circuitry for detecting the frequency of the oscillator signal. Counters 34 and 38 may be discrete counters (as illustrated in FIG. 1) or may be fully or partially incorporated into processor 20.

In a preferred embodiment of the present invention, a digital processor 20 includes on-board read only memory (ROM) and random access memory (RAM) storage. In addition, non-volatile memory 40 stores additional data such as operator selected settings which is accessible to processor 20 through multiplexer 28.

Vehicle detector 10 has four output channels, one for each of the four sensors 12A-12D. The first output channel, which is associated with inductive sensor 12A, includes primary output circuit 42A and auxiliary output circuit 44A. Similarly, primary output circuit 42B and auxiliary output circuit 44B are associated with inductive sensor 12B and form the second output channel. The third output channel includes primary output circuit 42C and auxiliary output circuit 44C, which are associated with inductive sensor 12C. The fourth channel includes primary output circuit 42D and auxiliary output circuit 44D, which are associated with inductive sensor 12D.

Processor 20 controls the operation of primary output circuits 42A-42D, and also controls the operation of auxiliary output circuits 44A-44D. The primary output circuits 42A-42D provide an output which is conductive even when vehicle detector 10 has a power failure. The auxiliary output circuits 44A-44D, on the other hand, have outputs which are non-conductive when power to vehicle detector 10 is off.

In operation, processor 20 provides sensor select signals to input circuits 14A-14D to connect sensor drive oscillator 16 to inductive sensors 12A-12D in a time multiplexed fashion. Similarly, a sensor select signal to dummy sensor 12E causes it to be connected to sensor drive oscillator 16. Processor 20 also provides a control input to sensor drive oscillator 16 to select alternate capacitance values used to resonate with the inductive sensor 12A-12D or dummy sensor 12E. When processor 20 selects one of the input circuits 14A-14D or dummy sensor 12E, it also enables cycle counter 34. As sensor drive oscillator 16 is connected to an inductive load (e.g., input circuit 14A and sensor 12A) it begins to oscillate. The oscillator signal is supplied to cycle counter 34, which counts oscillator cycles. After a brief stabilization period for the oscillator signal to stabilize, processor 20 enables period counter 38, which counts in response to a very high frequency (e.g., 20 Mhz) signal from crystal oscillator 36.

When cycle counter 34 reaches a predetermined number of sensor drive oscillator cycles after oscillator stabilization, it provides a control signal to period counter 38, which causes counter 38 to stop counting. The final count contained in period counter 38 is a function of the frequency of the sensor drive oscillator signal, and therefore of the inductance of inductive sensor 12A.

In a preferred embodiment of the present invention, each measurement period (which is defined by a predetermined number of sensor drive oscillator cycles) constitutes a "frame segment" of a larger "measurement frame". Each time a frame segment is completed, the final count from period counter 38 is combined with a number which is derived from the final counts produced during earlier frame segments to produce a measurement value. This measurement value is a function of the frequency of the oscillator output signal during the just-completed frame segment, as well as frequency measured during earlier frame segments.

The measurement value is then compared to a reference value. If the measurement value exceeds the reference value by greater than a threshold value, this indicates that a vehicle is present, and processor 20 provides the appropriate output signal to the appropriate primary and auxiliary output circuit.

(2) ΔL Sensitivity Thresholds

In the following discussion, changes in the oscillator signal caused by an inductance change of a sensor 12A–12D will be discussed in terms of period (T) rather than frequency (f). This is simply a matter of convenience for mathematical expression. Frequency is equal to the inverse of period (i.e., f=1/T). Frequency is inversely related to sensor inductance (L) while period is directly related to inductance (i.e., an increase in inductance causes an increase in period).

Any given inductive sensor detector has a relatively constant total inductance $L_{Total}$ when no vehicle is present over the sensor detection area. The total inductance is comprised of the inductances internal to the detector, the inductance of the lead wire connecting the detector to the inductive sensor, and the inductance of the inductive sensor. Additionally, any one type of inductive sensor will have a relatively fixed inductance change for a particular type of vehicle.

Unlike other methods in which some form of a ratio of the inductance change ΔL to the total inductance $L_{Total}$ is used to detect vehicles, using ΔL sensitivity thresholds provides a direct relationship between the inductance change caused by any particular vehicle and the detection of that vehicle. Using the ΔL sensitivity method, the change in inductance of a particular type of sensor, caused by any particular vehicle type, may be observed. The sensitivity can then be directly adjusted so as to ensure detection of that type of vehicle by setting the ΔL sensitivity to a value less than (more sensitive) the change in inductance caused by that vehicle type. This direct relationship between the inductance change caused by a vehicle and the ΔL sensitivity setting that will ensure detection of that vehicle may be used to assist operators in properly setting detector sensitivity.

In operation, detector 10 actually measures changes in sensor drive oscillator signal period instead of changes in sensor inductance. In a preferred embodiment, implementation of the ΔL sensitivity method does not result in adjustment of the threshold change in period $\Delta T_{Thresh}$ which is indicative of the presence of a vehicle, but rather results in adjustment of the period $T_{meas}$ during which the period of the oscillator signal is measured. Determination of the measurement period $T_{meas}$ is dependent on both the desired ΔL sensitivity setting and the period of the sensor drive oscillator signal with no vehicle present. Therefore, the first step in calculating the measurement period which corresponds to a particular ΔL sensitivity setting is to measure the period $T_{nv}$ of the sensor drive oscillator with no vehicles present over the sensor detection area. A change in period ΔT of the sensor drive oscillator signal can be shown to have the following relationship with the corresponding change in sensor inductance ΔL:

$$\Delta T = (\pi * \sqrt{c}) * \left( \frac{\Delta L}{\sqrt{L_{sensor} + L_0}} \right) \quad \text{Equation 1}$$

where,
C=the detector capacitance used to resonate the sensor
$L_{sensor}$=inductance of the inductive sensor and lead-in wire $L_0$=residual inductance internal to the detector The original measurement period $T_{meas}$ can be defined by:

$$T_{meas} = N_{meas} * T_{nv} \quad \text{Equation 2}$$

where $T_{meas}$=the time duration of a single measurement period $N_{meas}$=a constant with an integer value which represents the number of cycles of the sensor drive oscillator signal during one measurement period $T_{nv}$=the period of the sensor drive oscillator signal with no vehicle present over the sensor detection area.

A change in the measurement period $\Delta T_{meas}$, due only to changes in period of the sensor drive oscillator signal with no vehicles present $\Delta T_{nv}$ may then be characterized as:

$$\Delta T_{meas} = N_{meas} * \Delta T_{nv} \quad \text{Equation 3}$$

While the detector is operating at a resonant frequency corresponding to the period $T_{nv}$ of the sensor drive oscillator signal, the change in measurement period $\Delta T_{meas}$ necessary to implement a sensitivity such that a particular inductance change ΔL will be detected is defined by:

$$\Delta T_{meas} = K_{thr} * T_{cry} \quad \text{Equation 4}$$

where $\Delta T_{meas}$=the change in measurement period from $T_{meas}$ that is necessary for a change in inductance of ΔL to be detected $K_{thr}$=constant (normally an integer)

$T_{cry}$=the period of crystal oscillator 36 which is being counted during $T_{meas}$ Substituting Equations 3 and 4 into Equation 2:

$$N_{meas} = \frac{K_{thr} * T_{cry}}{\Delta T_{nv}} = \left( \frac{K_{thr} * T_{cry}}{\pi * \sqrt{C}} \right) * \frac{\sqrt{L_{SENSOR} + L_0}}{\Delta L} \quad \text{Equation 5}$$

$$T_{meas} = \left( \frac{K_{thr} * T_{cry} * \sqrt{L_{sensor} + L_0}}{\pi * \sqrt{C} * \Delta L} \right) * (2 * \pi * \sqrt{C} * \sqrt{L_{sensor} + L_0})$$

$$T_{meas} = (2 * K_{thr} * T_{cry}) * \left( \frac{L_{sensor} + L_0}{\Delta L} \right) \quad \text{Equation 6}$$

Equation 6 may be rearranged to show:

$$K_{thr} = \frac{T_{meas} * \Delta L}{2 * T_{cry} * (L_{sensor} + L_0)} \quad \text{Equation 7}$$

Substituting Equation 7 into Equation 4:

$$\Delta T_{meas} = \left( \frac{T_{meas} * \Delta L}{2 * T_{cry} * (L_{sensor} + L_0)} \right) * T_{cry} \quad \text{Equation 8}$$

$$= \frac{T_{meas} * \Delta L}{2 * (L_{sensor} + L_0)}$$

For any equation:

$$K * \left( \frac{A}{B} \right) = K * \left( \frac{C}{B} \right) * \left( \frac{A}{C} \right) \quad \text{Equation 9}$$

The principle of Equation 9 may be used to convert the above equations so that the $T_{meas}$ sensitivity equations do not contain $L_0$:

$$T_{nv}^2 = 4 * \pi^2 * C * (L_{sensor} + L_0)$$

-continued $$L_{sensor} = \frac{T_{nv}^2 - (4 * \pi^2 * C * L_0)}{4 * \pi^2 * C}$$ Equation 10

$$L = \frac{T_{nv}^2 - T_0^2}{4 * \pi^2 * C}$$

$$L_{sensor} + L_0 = \frac{T_{nv}^2}{4 * \pi^2 * C}$$ Equation 11

Substituting Equation 11 into Equation 6 gives the result:

$$T_{meas} = (2 * K_{thr} * T_{cry}) * \left( \frac{\frac{T_{nv}^2}{4 * \pi^2 * C}}{\Delta L} \right)$$ Equation 12

$$T_{meas} = \frac{K_{thr} * T_{cry} * T_{nv}^2}{2 * \pi^2 * C * \Delta L}$$

Equation 12 defines, with the detector's known steady state parameters, the measurement period duration $T_{meas}$ necessary to detect a particular inductance change $\Delta L$.

In operation, the measurement period $T_{meas}$ is equivalent to the time needed to count $N_{meas}$ cycles of the sensor drive oscillator signal. Therefore, Equation 12 may be used to calculate $N_{meas}$.

$$N_{meas} = \frac{T_{meas}}{T_{nv}}$$ Equation 13

$$N_{meas} = \frac{K_{thr} * T_{cry} * T_{nv}}{2 * \pi^2 * C * \Delta L}$$

and $$\Delta T_{thresh} = \frac{2 * \pi^2 * C * N_{MEAS} * \Delta L}{T_{NV}} = K_{thr} * T_{cry}$$

The preceding discussion is a detailed analysis of the $\Delta L$ sensitivity method. It is useful, at this time, to review the method in a more general manner. First, the detector measures the period $T_{nv}$ of the sensor drive oscillator with no vehicles present over the sensor detection area. Next, for a particular selected $\Delta L$ sensitivity value, Equation 12 is used to define the measurement period $T_{meas}$. This period $T_{meas}$ may alternatively be defined as $N_{meas}$ cycles of the sensor drive oscillator using Equation 13. In the process of deriving the $\Delta L$ sensitivity Equations 12 and 13, we defined the $\Delta L/\sqrt{L}$ and $\Delta L/L$ Equations 5 and 6, respectively. As can be seen, Equations 12 and 13 are independent of total inductance, while Equations 5 and 6 are not.

Once $N_{meas}$ is determined, the detector measures the time duration of each period defined by $N_{meas}$ cycles of the sensor drive oscillator. The actual measurement of period time duration is accomplished by counting the number of cycles of a high frequency crystal oscillator during each measurement period. If the count during a measurement period changes from a reference count by more than a threshold count $\Delta T_{thresh}$, an output signal is produced, indicating that a vehicle is detected.

Another advantage of the $\Delta L$ sensitivity method is that for any particular detector and sensor type, the inductance change caused by a vehicle passing over the sensor will be independent of the total inductance of the system, and therefore independent of the length of the lead-in cable which connects the detector to the sensor. This factor is useful for accurate implementation of automatic sensitivity adjustment. Implementing automatic sensitivity adjustment with either of the sensitivity threshold methods which are dependent on the total inductance $L_{Total}$ would result in large errors in detector accuracy. This can be illustrated in the following example.

Lead-in cable has a typical inductance of 24 microhenries per 100 feet. Assume the detector and the sensor have the following characteristics:

| | |
|---|---|
| $L_{sensor}$ = | the inductance of the sensor |
| = | 76 microhenries |
| $L_{int}$ = | the inductance internal to the detector |
| = | 150 microhenries |
| $L_{cable}$ = | the inductance of the lead-in cable |
| $L_{Total}$ = | $L_{sensor} + L_{int} + L_{cable}$ |

Next, assume that a car and a motorcycle each passing over the sensor cause inductance changes of 1,745 nanohenries and 104 nanohenries respectively. Table 1 illustrates the effect that different lead-in cable lengths would have on the measured parameters which are used to implement each of the three sensitivity methods.

TABLE 1

| Lead-in Length | $L_{Total}$ | $\Delta L$ | | $\Delta L/L$ | | $\Delta L/\sqrt{L}$ | |
|---|---|---|---|---|---|---|---|
| | | Car | Motor-cycle | Car | Motor-cycle | Car | Motor-cycle |
| 50 ft | 238 µH | 1745 nH | 104 nH | .733% | .044% | $1.13*10^{-4}$ | $6.74*10^{-6}$ |
| 100 ft | 250 µH | 1745 nH | 104 nH | .698% | .042% | $1.10*10^{-4}$ | $6.58*10^{-6}$ |
| 250 ft | 286 µH | 1745 nH | 104 nH | .610% | .036% | $1.03*10^{-4}$ | $6.15*10^{-6}$ |
| 500 ft | 346 µH | 1745 nH | 104 nH | .504% | .030% | $9.38*10^{-5}$ | $5.59*10^{-6}$ |

As can be seen from Table 1, as lead-in cable length increases, the measured $\Delta L$ caused by the car and motorcycle remains the same. The same is not true for the measured $\Delta L/L$ and $\Delta L/\sqrt{L}$. This dependency on lead-in cable length would therefore create difficulties in implementing any method of automatic detector sensitivity adjustment dependent on the total inductance $L_{Total}$. Any attempt to set thresholds, other than the $\Delta L$ sensitivity type, to some known percentage of change characteristic of a given vehicle type would have large errors introduced anytime a non-standard length lead-in cable was used.

(3) Automatic Sensitivity Adjustment

The detector may be set to automatically adjust the sensitivity setting as vehicles pass over the sensor detection area. During initialization, processor 20 measures the period of the sensor drive oscillator signal with no vehicle over the sensor detection area. With the sensitivity set at an initial value of 64 nanohenries, the measurement period $T_{meas}$ is calculated. If a vehicle entering the sensor detection area causes a change of count in period counter 38 greater than a threshold value $\Delta T_{Thresh}$ during the $T_{meas}$ corresponding to the 64 nanohenry $\Delta L$ sensitivity setting, a vehicle is detected.

While the vehicle is passing over the sensor detection area, processor 20 monitors period counter 38 for a magnitude change in count $\Delta COUNT_{MAX}$. A magnitude change in inductance $\Delta L_{MAX}$ caused by the vehicle can then be calculated by:

$$\Delta L_{MAX} = \frac{COUNT_{nv} * \Delta COUNT_{MAX}}{2 * \pi^2 * C * F_{cry}^2 * N_{meas}^2} \qquad \text{Equation 14}$$

where, $COUNT_{nv}$=the period count during $T_{meas}$ with no vehicle over the detection area $F_{cry}$=the frequency of crystal oscillator 36

As each of n additional vehicles passes over the sensor detection area, an average inductance (or period) change is calculated using the following equations:

For n = 1    Equation 15
$$\Delta L_{ave} = \Delta L_{MAX}$$

For $2 < n \leq 32$    Equation 16
$$\Delta L_{ave} = \frac{\sum_{i=1}^{n} \Delta L_{MAXi}}{n}$$

where, $\Delta L_{MAXi}$=the magnitude inductance change caused by the $i^{th}$ vehicle For n > 32    Equation 17
$$\Delta L_{ave} = \frac{(\Delta L_{MAXn} + 32 * \Delta L_{ave} - \Delta L_{ave})}{32}$$

After a maximum period count (magnitude inductance change) caused by each vehicle has been detected, processor 20 automatically sets the detector sensitivity S to the setting nearest $\Delta L_{ave}$ divided by 60 when the sensor is a "standard" loop inductive sensor, and to the setting nearest $\Delta L_{ave}$ divided by 8 when the sensor is a "single" Microloop sensor of the type described in U.S. Pat. No. 4,449,115 (Koerner). The sensitivity may be set to different fractions of $\Delta L_{ave}$ for other sensor types known in the industry.

It is, at this time, useful to summarize the automatic sensitivity adjustment method in more general terms. The period $T_{nv}$ of sensor drive oscillator is measured over a predetermined number of oscillator cycles. Using the measured period $T_{nv}$ and an initial sensitivity setting of 64 nanohenries, an initial measurement period $T_{meas}$ (defined by $N_{meas}$ cycles of the sensor drive oscillator) is calculated. An average magnitude change in inductance $\Delta L_{ave}$ is taken for a predetermined number of vehicles. The sensitivity is then automatically adjusted to some fraction of $\Delta L_{ave}$, and the measurement period $T_{meas}$ is recalculated.

The reason that the sensitivity is set to a known fraction of the average inductance change $\Delta L_{ave}$ is that the assumption is made that $\Delta L_{ave}$ was comprised primarily of measurements made while cars were over the sensor. Since the $\Delta L$ sensitivity method allows us to know that ratios such as $$\frac{\Delta L_{MOT}}{\Delta L_{CAR}}$$

will be consistent, for a basic sensor type regardless of lead-in cable length, we know what fraction of $\Delta L_{ave}$ is an adequate sensitivity to detect a motorcycle. This is not possible, or at least will result in less accuracy, with detectors which use $\Delta L/L$ or $\Delta L/\sqrt{L}$ sensitivity such that these ratios cannot be predetermined.

(4) Example

The $\Delta L$ sensitivity method greatly increases the probability that the sensitivity will be properly set. Properly setting the sensitivity level is extremely important, particularly in applications such as speed measurement. The importance of properly setting sensitivity levels in speed measurement is illustrated in several examples based upon the actual measurements shown in FIG. 2. In these examples, speed calculations are made using two different sensitivity settings and the results are compared to the actual known speeds. The examples are intended to demonstrate the effects of sensitivity settings in applications such as speed measurement. However, the examples are not intended to demonstrate how $\Delta L$ sensitivity is implemented, and therefore the auto sensitivity adjustment method and the calculation of the measurement period $T_{meas}$ are not discussed. To further simplify the examples, the threshold change in sensor drive oscillator signal period $\Delta T_{Thresh}$ is adjusted to implement the desired sensitivity setting. However, it is important to remember that in actual operation, $\Delta T_{Thresh}$ usually remains constant while the measurement period $T_{meas}$ is adjusted.

Figure 2:
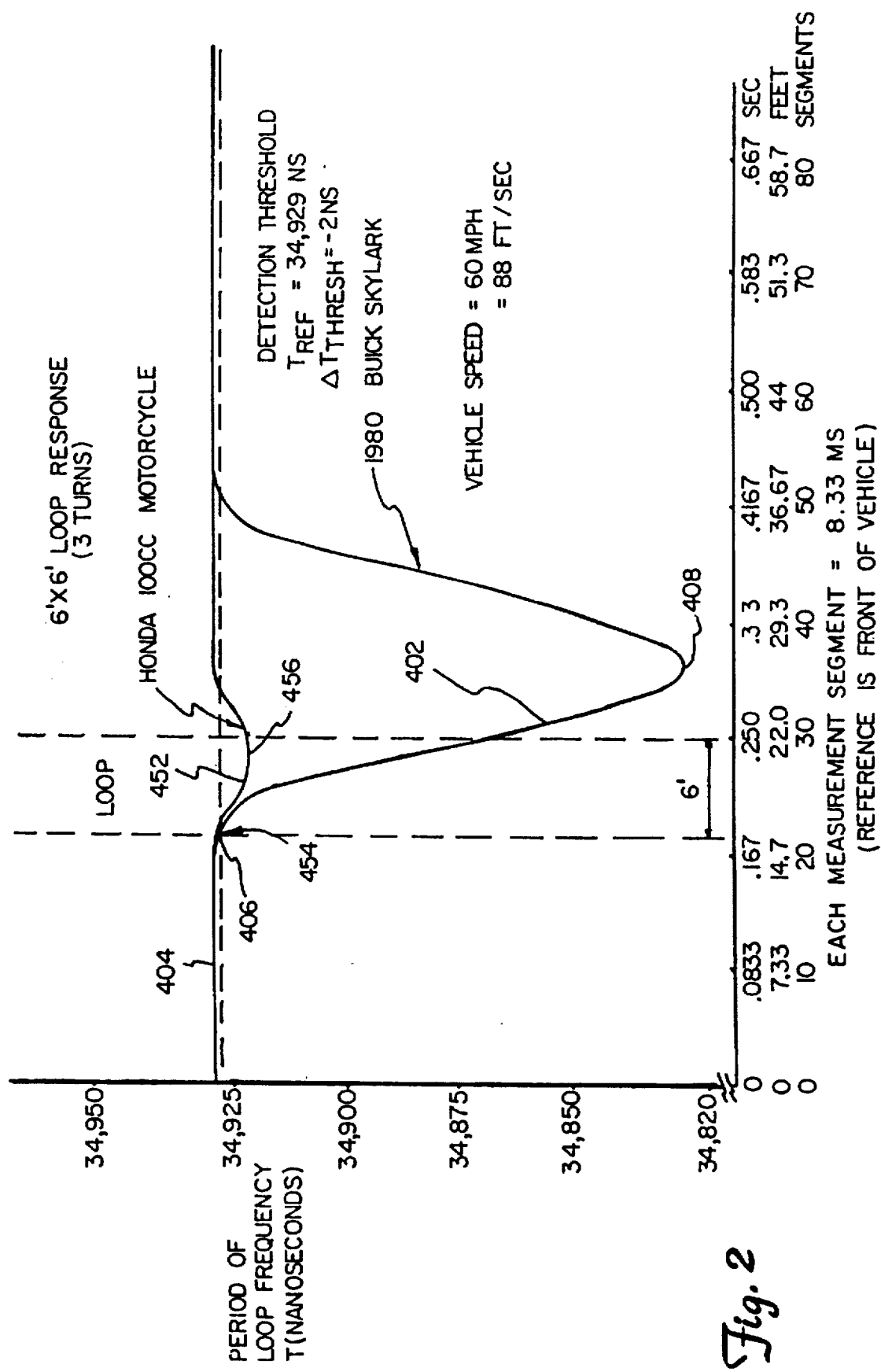
FIG. 2 is a graph illustrating actual measurements of period (T) as a function of time (t) as two separate vehicles passed through the detection area associated with an inductive sensor.

FIG. 2 illustrates the change in sensor drive oscillator signal period caused first by a 1980 Buick Skylark (curve 402), and second by a Honda 100 cc motorcycle (curve 452), as each vehicle passes over the sensor detection area at a known speed of 88 feet/sec (or 60 mph).

In these examples, the detector characteristics were found to be:

| | |
|---|---|
| $L_{sensor}$ = | 100 microhenries |
| $L_0$ = | 150 microhenries |
| C = | 0.09 microfarads |
| $R_s$ = | series resistance of sensor and drive oscillator |
| = | 55 ohms |
| $T_{ref}$ = | measured period of the sensor drive oscillator with no vehicle present |
| = | 34,929 nanoseconds |

In the first two examples, the $\Delta L$ sensitivity is set at $-32$ nanohenries. This $\Delta L$ sensitivity setting may be converted to its corresponding change in sensor drive oscillator signal period $\Delta T_{Thresh}$ using Equation 1.

$$\Delta T_{Thresh} = (\pi * \sqrt{C}) * \left(\frac{\Delta L}{\sqrt{L_{sensor} + L_0}}\right)$$

$$\Delta T_{Thresh} = (3.141 * \sqrt{.09*10^{-6}}) * \left(\frac{-32*10^{-9}}{\sqrt{250*10^{-6}}}\right)$$

$$\Delta T_{Thresh} = -1.907 \text{ nanoseconds} \approx -2 \text{ nanoseconds}$$

In the first example, as the car enters the detection area the threshold change in oscillator signal period $\Delta T_{Thresh}$, which corresponds to a $\Delta L$ sensitivity setting of 32 nanohenries, is surpassed as shown by point 406 of FIG. 2. After a number of measurement frame segments, a magnitude change in period $\Delta T_{MAXCAR}$ is detected as shown by point 408. The actual value $\Delta T_{MAXCAR}$ is calculated by subtracting the initial reference period value 404 from the magnitude period value 408 as shown in Equation 18.

$$\Delta T_{MAXCAR} = 34,825 \text{ nanoseconds} - 34,929 \text{ nanoseconds}$$
$$= -104 \text{ nanoseconds}$$

Next, the time rate of change dT/dt of the oscillator signal period is calculated. For ease of illustration, the values dT and dt will be obtained as illustrated in Equations 19 and 20.

$$dT = \Delta T_{MAXCAR} - \Delta T_{Thresh} \qquad \text{Equation 19}$$
$$= -104 \text{ nanoseconds} - (-2 \text{ nanoseconds})$$
$$= -102 \text{ nanoseconds}$$

$$dt = (\text{\# of measurement segments}) * \left( \frac{\text{time}}{\text{measurement segment}} \right) \qquad \text{Equation 20}$$
$$= (15 \text{ segments}) * \left( \frac{.00833 \text{ seconds}}{\text{segment}} \right)$$
$$= .125 \text{ seconds}$$

$$\frac{dt}{dt} = \frac{-102 \text{ nanoseconds}}{0.125 \text{ seconds}} \qquad \text{Equation 21}$$
$$= -816 * 10^{-9}$$

The vehicle entry time $ET_{car}$ is then calculated as shown in Equation 22.

$$ET_{CAR} = \frac{\Delta T_{MAXCAR}}{\frac{dT}{dt}} \qquad \text{Equation 22}$$
$$= \frac{-104*10^{-9}}{-816*10^{-9}} = 0.12745 \text{ seconds}$$

An entry distance $d_{entrycar}$ is then calculated as specified in Equation 23.

$$d_{entryCAR} = d_{entryave} * A \left( B - \frac{\Delta T_{Thresh}}{\Delta T_{MAXCAR}} \right) \qquad \text{Equation 23}$$
$$= (11.7 \text{ ft.})*(2.0) \left( 0.5 - \frac{-2 \text{ nanosec}}{-104 \text{ nanosec}} \right)$$
$$= 11.25 \text{ ft.}$$

where, A and B are somewhat arbitrarily defined constants and where,
A=2.0
B=0.5
$d_{entryave}$=11.7 ft.
Finally, speed is calculated as specified in Equation 24.

$$S_{CAR} = \frac{d_{entryCAR}}{ET_{CAR}} \qquad \text{Equation 24}$$
$$= \frac{11.25 \text{ ft.}}{0.12745 \text{ sec.}}$$
$$= 88.26 \frac{\text{ft}}{\text{sec}}$$

The measured speed of 88.26 feet per second represents an error of approximately 0.3% from the actual value of 88 feet per second. The use of a threshold change of period $\Delta T_{Thresh}$ (representative of a $\Delta L$ sensitivity setting) in Equations 19 and 23 illustrates the role that sensitivity plays in an application such as speed measurement.

In the second example, as the motorcycle enters the detection area the threshold change in oscillator signal period is surpassed as shown by point 454 of FIG. 2. As in the previous example, a magnitude change in period $\Delta T_{MAXMOT}$ 456 is detected after a number of measurement frame segments. The actual value of $\Delta T_{MAXMOT}$ is similarly calculated by subtracting the initial reference period value 404 from the magnitude period value 456.

$$\Delta T_{MAXMOT} = 34,921 \text{ nanoseconds} - 34,929 \text{ nanoseconds} \qquad \text{Equation 25}$$
$$= -8 \text{ nanoseconds}$$

It is useful to note that the change in oscillator period 452 caused by the motorcycle is of lesser magnitude and duration than the change in oscillator period caused by the larger car.

Next the time rate of change dT/dt of the oscillator signal is calculated.

$$dT = \Delta T_{MAXMOT} - \Delta T_{Thresh} \qquad \text{Equation 26}$$
$$= -8 \text{ nanoseconds} - (-2 \text{ nanoseconds})$$
$$= -6 \text{ nanoseconds}$$

$$dt = (\text{\# of measurement segments}) * \left( \frac{\text{time}}{\text{segment}} \right) \qquad \text{Equation 27}$$
$$= (6 \text{ segments}) * \left( \frac{0.00833 \text{ seconds}}{\text{segment}} \right)$$
$$= 0.050 \text{ seconds}$$

$$\frac{dT}{dt} = \frac{-6 \text{ nanoseconds}}{0.050 \text{ seconds}} = -120*10^{-9} \qquad \text{Equation 28}$$

The vehicle entry time $ET_{MOT}$ is then calculated.

$$ET_{MOT} = \frac{\Delta T_{MAXMOT}}{\frac{dT}{dt}} \qquad \text{Equation 29}$$
$$= \frac{-8*10^{-9} \text{ seconds}}{-120*10^{-9}}$$
$$= 0.0667 \text{ seconds}$$

An entry distance $d_{entryMOT}$ is then calculated for the motorcycle.

$$d_{entryMOT} = d_{entryave} * A \left( B - \frac{\Delta T_{Thresh}}{\Delta T_{MAXMOT}} \right) \qquad \text{Equation 30}$$
$$= (11.7 \text{ ft}) * (2.0) * \left( 0.5 - \frac{-2 \text{ nanoseconds}}{-8 \text{ nanoseconds}} \right)$$
$$= 5.85 \text{ ft}$$

Finally, speed is calculated.

$$S_{MOT} = \frac{d_{entryMOT}}{ET_{MOT}} \qquad \text{Equation 31}$$
$$= \frac{5.85 \text{ ft}}{0.0667 \text{ seconds}}$$
$$= 87.71 \frac{\text{ft}}{\text{second}}$$

The measured motorcycle speed of 87.71 feet per second represents an error of approximately 0.33% from the actual speed of 88 feet per second. The first two examples illustrate how, with the proper sensitivity setting, accurate speed measurements may be accomplished with an inductive sensor vehicle detector system. If the sensitivity is not properly set, the detector speed measurement error may increase significantly. This results as a consequence of the fact that as detector sensitivity is decreased (ΔL increases), the number of measurement segments between $\Delta T_{MAXCAR}$ and $\Delta T_{Thresh}$, used in Equations 20 and 27, also decreases. As the number of measurement segments decreases, the likelihood that Equations 21 and 28 accurately represent the slopes of curves 402 and 452 (FIG. 2) also decreases. Typical errors of this type result from the use of one extra (or one too few) measurement segments in Equations 20 and 27. As the sensitivity is decreased, and thus the total measurement segments used in Equations 20 and 27 also decreases, this error resulting from the use of one extra (or one too few) measurement segments is magnified.

Tables 2 and 3 illustrate the effect that various sensitivity settings would have on speed measurement calculations both with and without an error of one measurement scanning segment. As illustrated in the Tables, as the detector sensitivity is decreased (ΔL increased), the speed measurements differ from the known speeds of 88 feet per second by increasing amounts of error. In the extreme cases, with the ΔL sensitivity set to 256 nanohenries, the speed measurement for the car may be as low as 77.2 feet per second, as illustrated in Table 2, when one extra measurement segment is used. This represents an error of over 12%. With the same 256 nanohenry sensitivity setting, Table 3 illustrates the fact that the motorcycle would not even be detected.

TABLE 2

| ΔL Sensitivity (nH) | 32 | 64 | 256 |
|---|---|---|---|
| Car at 60 mph - 88 ft/sec | | | |
| $\Delta T_{max}$ (nsec) | −104 | −104 | −104 |
| dT (nsec) | −102 | −100.2 | −88.7 |
| Number of Measurement Segments | | | |
| Nominal | 15 | 14 | 10 |
| With Error | 16 | 15 | 11 |
| $d_{entry}$ (ft) | 11.25 | 10.8 | 8.3 |
| Speed Measurement (ft/sec) | | | |
| Nominal | 88.2 | 89.2 | 85 |
| With Error | 82.38 | 83.3 | 77.2 |

TABLE 3

| ΔL Sensitivity (nH) | 32 | 64 | 256 |
|---|---|---|---|
| Motorcycle at 60 mph - 88 ft/sec | | | |
| $\Delta T_{max}$ (nsec) | −8 | −8 | −8 |
| dT (nsec) | −6 | −4.3 | −15.3 |
| Number of Measurement Segments | | | |
| Nominal | 6 | 4 | * |
| With Error | 7 | 5 | * |
| $d_{entry}$ (ft) | 5.88 | 5.54 | * |
| Speed Measurement (ft/sec) | | | |
| Nominal | 87.8 | 87.3 | * |
| With Error | 75.3 | 69.7 | * |

*Motorcycle would not be detected.

(5) Conclusion

The object detection method of the present invention uses a sensitivity adjustment that is based directly upon the change of inductance caused by objects such as vehicles over the sensor detection area. This allows more precise sensitivity setting which results in increased detector accuracy. Preferably, the method of the present invention also automatically adjusts the sensitivity setting, based upon changes in oscillator signal frequency caused by the presence of a vehicle, which eliminates the need for skilled operator interface when adjusting sensitivity.

Although the present invention has been described with reference to preferred embodiments, workers skilled in the art will recognize that changes may be made in form and detail without departing from the spirit and scope of the invention.

What is claimed is:

1. A method of setting the sensitivity of an object detector having a processor, in which the inductance of an inductive sensor varies with the presence of an object in a detection area, comprising the processor implemented steps of:

(a) driving an inductive sensor with an oscillator so that the oscillator signal has a period which is a function of the inductance of the inductive sensor;

(b) selecting a minimum change in sensor inductance which will result in detection of an object;

(c) selecting a threshold which is to indicate presence of an object;

(d) determining the period of the oscillator signal when no object is present;

(e) setting the sensitivity by defining a measurement period based on the selected minimum change in sensor inductance, the threshold and the period of the oscillator signal when no object is present, such that the sensitivity is independent of total system inductance;

(f) measuring the period of the oscillator signal during a measurement period;

(g) comparing the measured period of the oscillator signal to the period of the oscillator signal when no object is present and generating therefrom a difference;

(h) detecting an object if the difference equals or exceeds the threshold; and (i) adjusting the sensitivity of the object detector, comprising the steps of:

measuring a time duration of an initial measurement period which is a function of the frequency of the oscillator signal;

setting the sensitivity at an initial value by determining a second measurement period based on the period of the oscillator signal as determined during the initial measurement period and an initial inductance change expected to result in the detection of a said object;

measuring the time duration of each of a plurality of said second measurement periods;

determining when each of a plurality of objects has entered the detection area based on changes in the time duration of each said second measurement period;

determining a magnitude change of time duration of each said second measurement period caused by each of the plurality of objects;

averaging magnitude changes in time duration of said second measurement period caused by the plurality of objects; and adjusting the sensitivity by determining a new measurement period, wherein the new measurement period is based on a predetermined fraction of the average magnitude change caused by the plurality of objects.

2. The method according to claim 1 wherein the predetermined fraction is a function of the smallest object to be detected.

3. The method according to claim 1 wherein the predetermined fraction is a function of the inductive sensor.

4. A method of setting the sensitivity of an object detector having a processor, in which the inductance of an inductive sensor varies with the presence of an object in a detection area, comprising the processor implemented steps of:

(a) driving an inductive sensor with an oscillator so that the oscillator signal has a period which is a function of the inductance of the inductive sensor;

(b) selecting a minimum change in sensor inductance which will result in detection of an object;

(c) selecting a threshold which is to indicate presence of an object;

(d) determining the period of the oscillator signal when no object is present;

(e) setting the sensitivity by defining a measurement period based on the selected minimum change in sensor inductance, the threshold and the period of the oscillator signal when no object is present, such that the sensitivity is independent of total system inductance;

(f) measuring the period of the oscillator signal during a measurement period;

(g) comparing the measured period of the oscillator signal to the period of the oscillator signal when no object is present and generating therefrom a difference;

(h) detecting an object if the difference equals or exceeds the threshold; and (i) adjusting the sensitivity of the object detector, comprising the steps of:

defining an initial measurement period and determining a corresponding reference time duration of the initial measurement period;

defining an initial amount the defined measurement period must change in time duration to result in an object being detected;

measuring periodically the time duration of the defined measurement periods;

determining an average magnitude change in time duration of the initial measurement period associated with a plurality of objects; and adjusting the sensitivity of the object detector by redefining the amount the defined measurement period must change in time duration to result in an object being detected based on a predetermined fraction of the average magnitude change caused by the plurality objects.

5. A method of adjusting the sensitivity of a vehicle detector having a processor, and in which an inductive sensor is driven by an oscillator to produce an oscillator signal having a frequency which is a function of inductance of the inductive sensor, the duration of a measurement period defined by a given number of sensor oscillations is compared with the duration of a reference period and a vehicle-detected signal is produced when the comparison indicates a difference between the two periods exceeding an allowable amount, the sensitivity setting method comprising the processor implemented steps of:

determining the difference between said measurement and reference period associated with each of a plurality of said vehicle-detected signals, averaging the differences, and adjusting the sensitivity as a function of a predetermined fraction of the average differences.

6. The method according to claim 5 wherein the predetermined fraction is a function of the smallest object to be detected.

7. The method according to claim 5 wherein the predetermined fraction is a function of the inductive sensor.

8. A method of setting the sensitivity of an object detector having a processor, in which the inductance of an inductive sensor varies with the presence of an object in a detection area, comprising the processor implemented steps of:

(a) driving an inductive sensor with an oscillator so that the oscillator signal has a period which is a function of the inductance the inductive sensor;

(b) selecting a minimum charge in sensor inductance which will result in detection of an object;

(c) selecting a threshold which is to indicate presence of an object;

(d) determining the period of the oscillator signal when no object is present;

(e) setting the sensitivity by defining a measurement period based on the selected minimum change in sensor inductance, the threshold and the period of the oscillator signal when no object is present, such that the sensitivity is independent of at least lead-in line inductance of a lead-in line connected to the inductive sensor;

(f) measuring the period of the oscillator signal during a measurement period;

(g) comparing the measured period of the oscillator signal to the period of the oscillator signal when no object is present and generating therefore a difference; and (h) detecting an object if the difference equals or exceeds the threshold.

9. The method according to claim 8, wherein the measurement period is defined by an integer number of cycles of the oscillator signal.

10. A method of setting the sensitivity of an object detector having a processor, in which the inductance of an inductive sensor varies with the presence of an object in a detection area, comprising the processor implemented steps of:

(a) driving an inductive sensor with an oscillator so that the oscillator signal has a period which is a function of the inductance of the inductive sensor;

(b) selecting a minimum change in sensor inductance which will result in detection of an object;

(c) selecting a threshold which is to indicate presence of an object;

(d) determining the period of the oscillator signal when no object is present;

(e) setting the sensitivity by defining a measurement period based on the selected minimum change in sensor inductance, the threshold and the period of the oscillator signal when no object is present, such that the sensitivity is independent of total system inductance;

(f) measuring the period of the oscillator signal during a measurement period;

(g) comparing the measured period of the oscillator signal to the period of the oscillator signal when no object is present and generating therefrom a difference;

(h) detecting an object if the difference equals or exceeds the threshold;

(i) averaging the differences between the measured period of the oscillator signal and the period of the oscillator signal when no object is present caused by a plurality of objects; and (j) adjusting the sensitivity by defining a new measurement period based on a predetermined fraction of the average difference.

11. The method according to claim 8, wherein the threshold is defined by an integer number of cycles of a fixed frequency oscillator.

12. The method according to claim 8 further comprising the processor implemented step of selecting the threshold so that the threshold is equaled or exceeded when the selected minimum change in sensor inductance occurs.

13. The method according to claim 11 further including the processor implemented step of selecting a frequency of the fixed frequency oscillator such that the number of cycles of the fixed frequency oscillator during the measurement period will change by an amount at least equal to the threshold when the selected minimum change in sensor inductance occurs.

14. The method according to claim 8 further comprising the processor implemented step of adjusting the resolution of the object detector by selecting a new frequency of a fixed frequency oscillator.

15. The method according to claim 14 further comprising the processor implemented step of increasing the resolution of the object detector by increasing the frequency of the fixed frequency oscillator.

16. The method according to claim 10 wherein the predetermined fraction is a function of the smallest object to be detected.

17. The method according to claim 10 wherein the predetermined fraction is a function of the inductive sensor.

\* \* \* \* \*

UNITED STATES PATENT AND TRADEMARK OFFICE
CERTIFICATE OF CORRECTION

PATENT NO. : 5,734,338
DATED : March 31, 1998
INVENTOR(S) : Earl B. Hoekman and Martin C. Henderson It is certified that error appears in the above-indentified patent and that said Letters Patent is hereby corrected as shown below:

Col. 11, line 7, "Equation 18" is missing from right edge.

Col. 11, line 27, "dt" should read --dT-- in the top line of Equation 21.

Signed and Sealed this

Seventeenth Day of August, 1999

Attest:

Q. TODD DICKINSON

*Attesting Officer*  *Acting Commissioner of Patents and Trademarks*